United States Patent [19]

Lulay

[11] Patent Number: 5,467,653

[45] Date of Patent: Nov. 21, 1995

[54] APPARATUS FOR UNBALANCE COMPENSATION OF A GRINDING WHEEL

[75] Inventor: Eugen Lulay, Bensheim, Germany

[73] Assignee: Hofmann Maschinenbau GmbH, Germany

[21] Appl. No.: 64,983

[22] Filed: May 24, 1993

[30] Foreign Application Priority Data

Jul. 9, 1992 [DE] Germany .......................... 42 22 535.3

[51] Int. Cl.$^6$ .................................................. G01M 1/16
[52] U.S. Cl. ............................................... 73/469; 73/468
[58] Field of Search ............................ 73/468, 470, 460, 73/469

[56] References Cited

FOREIGN PATENT DOCUMENTS

| | | | |
|---|---|---|---|
| 0409050A2 | 1/1991 | European Pat. Off. | |
| 679842 | 8/1979 | U.S.S.R. | 73/468 |
| 712711 | 1/1980 | U.S.S.R. | 73/468 |
| 902553 | 8/1962 | United Kingdom | 73/469 |

*Primary Examiner*—Hezron E. Williams
*Assistant Examiner*—Christine K. Oda
*Attorney, Agent, or Firm*—Cushman Darby & Cushman

[57] ABSTRACT

An apparatus for unbalanced compensation of a grinding wheel which is rotatable about an axis of rotation, with compensating weights which are guided rotatably about the axis of rotation of the grinding wheel with symmetrical mass distribution relative to a central plane of the grinding wheel which is perpendicular to the axis of rotation. A positioning mechanism is provided for different angular positionings of the compensating weights. The compensating weights are mounted for rotation through 360° about the axis of rotation at different radii, the product of the mass of each compensating weight and its associated radius being equal to the product of the mass of each other compensating weight and its associated radius.

12 Claims, 3 Drawing Sheets

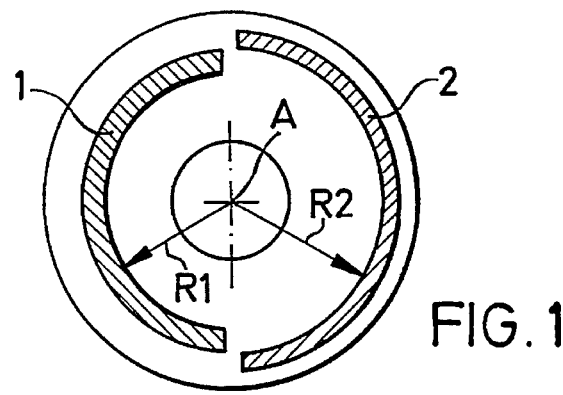
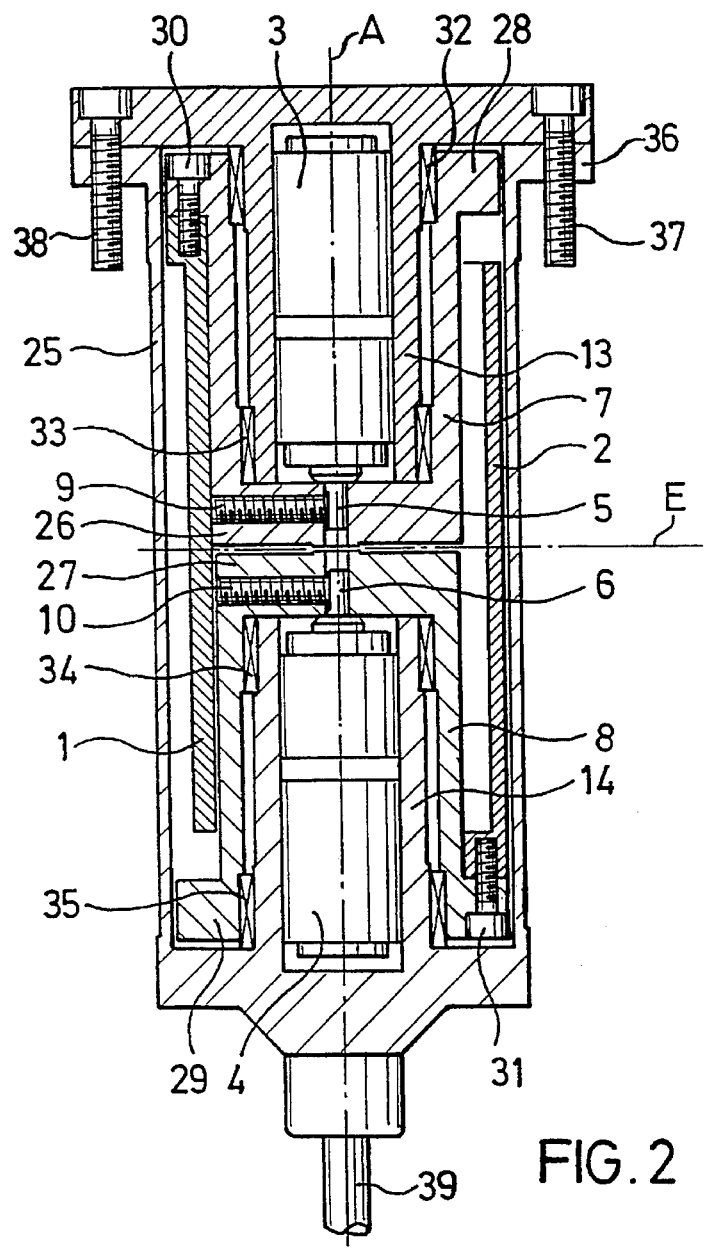
FIG. 1
FIG. 2

APPARATUS FOR UNBALANCE COMPENSATION OF A GRINDING WHEEL

BACKGROUND OF THE INVENTION

It is generally desirable that a grinding wheel should be in a condition of relatively good balance in order to give satisfactory results when used in a grinding operation and also to reduce the loading on the grinding wheel mounting arrangement. One form of apparatus for unbalance compensation of a grinding wheel rotatable about an axis of rotation, as disclosed in EP 0 409 050 A2, comprises two compensating weights which are guided rotatably about the axis of rotation with symmetrical mass distribution relative to a central plane of the grinding wheel, which is perpendicular to its axis of rotation. The two compensating weights are adjustable about the axis of rotation of the grinding wheel on equal radii at different angular Positions to provide for grinding wheel unbalance compensation. The apparatus includes positioning means for setting the compensating weights at different angular positions. When positioning the compensating weights at different positions, the centers of gravity of the compensating weights move in the central plane of the grinding wheel and thus the compensating weights afford symmetrical distribution of mass relative to the central plane of the grinding wheel, which is perpendicular to the axis of rotation thereof. That configuration provides a moment-free balancing system in comparison with grinding wheel balancing systems in which the centers of gravity of the compensating weights move in different planes. It is for that purpose that the compensating weights which are in the form of segments of a hollow cylinder and more specifically shell portions constituted by quarters of a cylinder, are moved on the same radius around the above-mentioned axis of rotation.

SUMMARY OF THE INVENTION

An object of the present invention is to provide an apparatus for unbalance compensation of a grinding wheel, in which the masses of the compensating weights are distributed uniformly around the axis of rotation thereof.

Another object of the present invention is to provide an apparatus for compensating for unbalance of a grinding wheel, which is of a compact and simple structure while affording satisfactory and reliable balancing results.

Still another object of the present invention is to provide an apparatus for compensating for unbalance of a grinding wheel, which involves simplicity of structure while being quick and easy to adjust to the required optimum setting.

In accordance with the principles of the present invention the foregoing and other objects are achieved by an apparatus for unbalance compensation of a grinding wheel which is rotatable about an axis of rotation, having compensating weights which are guided rotatably about said axis of rotation, with symmetrical distribution of mass relative to a central plane of the grinding wheel, which is perpendicular to said axis of rotation. A positioning means is provided for different angular positions of the compensating weights. The compensating weights are guided rotatably through 360° about the axis of rotation at different radii, the product of the mass of each respective compensating weight and its associated radius being of at least substantially the same magnitude for the compensating weights.

In a preferred feature of the invention the compensating weights are in the form of half-shell members, for example of semicylindrical configuration, which are movable past each other in their rotary movements through 360° about the axis of rotation. When there are for example first and second compensating weights, one being of greater mass than the other, the compensating weight of greater mass is disposed on an inner or shorter radius and the other compensating weight of smaller mass is on an outer or longer radius.

In accordance with another preferred feature, the apparatus can be of a compact structure, using a small number of individual components, if the positioning means comprises first and second electric control motors which are arranged around the axis of rotation, with the shafts of the first and second motors being disposed on the axis of rotation and facing towards each other. In that arrangement the electrical connections for the control motors can be on the outside of the assembly, to afford easy access.

In accordance with another preferred feature each of first and second compensating weights is fixed on a respective mounting sleeve which is rotatable about the axis of rotation and which extends over at least approximately the entire axial length of the respective control motor thereof. The rotary movement of the motors is transmitted to the respective mounting sleeve by way of internally disposed entrainment members which are non-rotatably connected to the motor shafts, without additional transmission assemblies such as gears and the like being required for that purpose. A suitable entrainment member in such a situation is a simple pin which provides the non-rotatable connection between the respective motor shaft and the associated mounting sleeve. Alternatively it is also possible to use another form of connection such as a spline connection or the like.

The control motors may preferably be fixed to mounting sleeves which are fixed with respect to the housing of the apparatus, in which case the rotatable mounting sleeves carrying the compensating weights can be rotatably mounted on the two mounting sleeves which are fixed with respect to the apparatus housing.

In a preferred embodiment of the present invention the compensating weights can be fixed to externally disposed flanges on the respectively associated mounting sleeves.

It is also possible for one compensating weight, for example at one end thereof, to be additionally rotatably mounted on another compensating weight, or a portion associated therewith. For that purpose, the apparatus may include a respective additional outwardly disposed mounting ring which is connected to the associated end of the mounting sleeve for supporting the compensating weight to be supported thereby.

However, instead of a housing which encloses the motors and the compensating weights and to which the grinding wheel can be fixed by a flange connection, it is also possible to use a cylindrical holding assembly which extends continuously through the apparatus and which affords a space in the interior thereof, in which the motors for adjusting the compensating weights are disposed. The cylindrical holding assembly serves as a connecting means for two end mounting plates, in which case one of the mounting plates may be connected for example by a flange connection to the grinding wheel. The rotatable mounting sleeves which are connected to the compensating weights are mounted on the outside or outward peripheral surface of the cylindrical holding assembly. The apparatus when assembled can then be disposed in a central bore in the grinding wheel. The rotary drive which is imparted by the motor shafts can be transmitted to the rotatable mounting sleeves by way of a suitable transmission such as a gear transmission.

Further objects, features and advantages of the present invention will be apparent from the following description of preferred embodiments.

BRIEF DESCRIPTION OF THE DRAWINGS

FIG. 1 is a diagrammatic view in section of the first and second compensating weights of a first embodiment of the invention, FIG. 2 is a view in longitudinal section through the first embodiment of the invention as shown in FIG. 1.

DESCRIPTION OF THE PREFERRED EMBODIMENTS

Reference will first be made generally to the first and second embodiments shown in FIGS. 1 and 2, and FIGS. 3 and 4 respectively.

Figure 3:
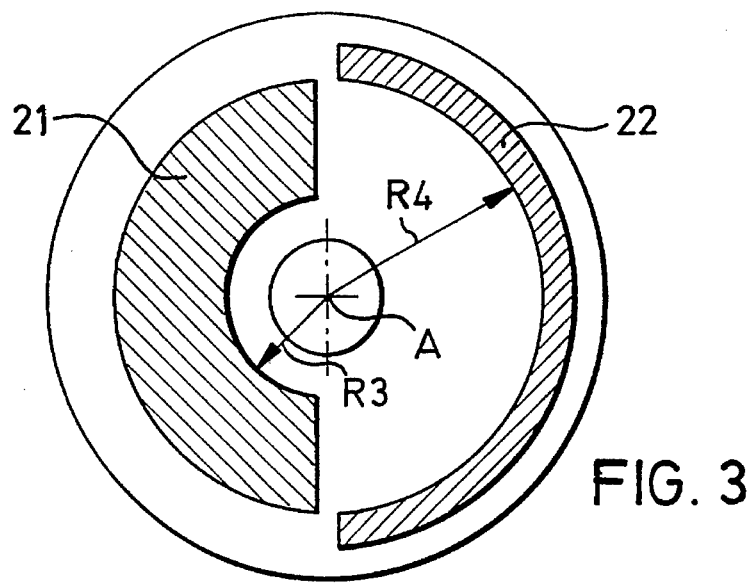
FIG. 3 is a diagrammatic view in section through the first and second compensating weights of a second embodiment of the invention.
Figure 4:
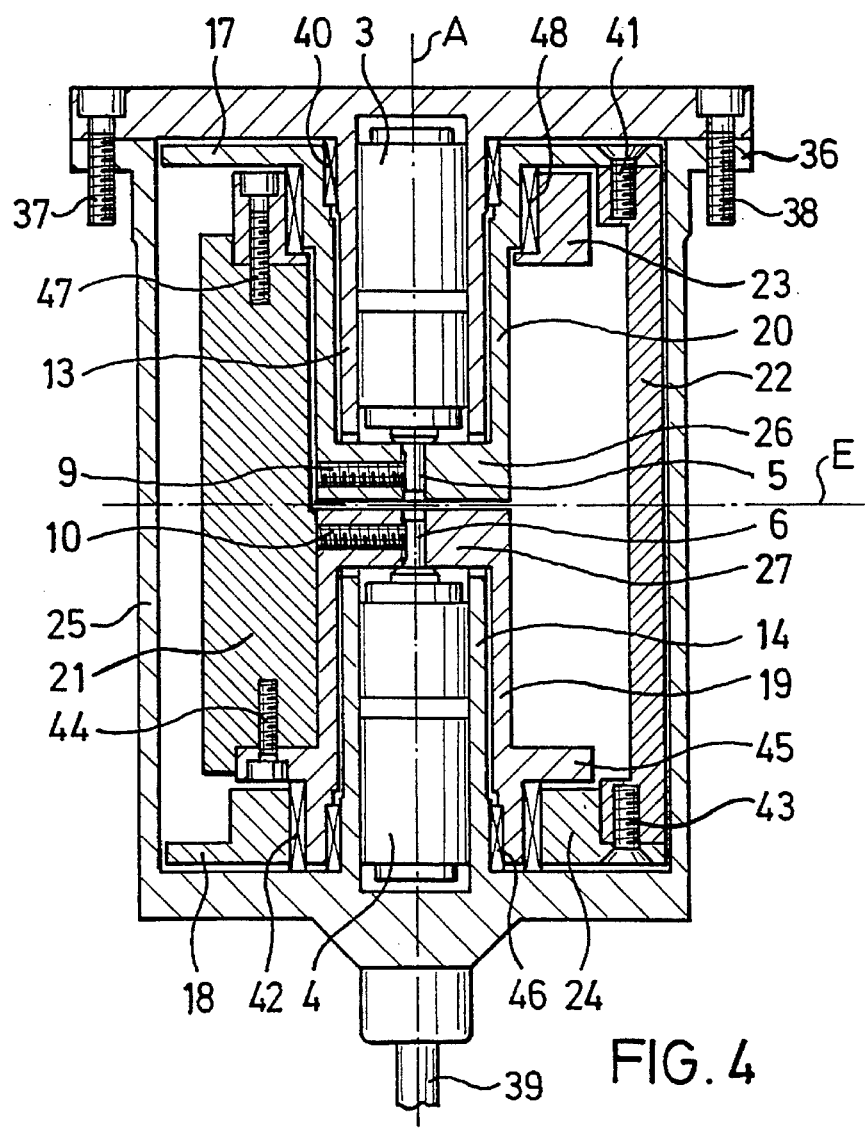
FIG. 4 is a view in longitudinal section through the second embodiment as shown in FIG. 3.

Each of these two embodiments has first and second compensating weights indicated at 1 and 2 in FIGS. 1 and 2 and at 21 and 22 in FIGS. 3 and 4. The compensating weights are guided on different guide radii R1 and R2 in FIGS. 1 and 2 and R3 and R4 in FIGS. 3 and 4 in circular guide paths around the axis of rotation A of the grinding wheel which is not shown in the drawings.

The compensating weights 1 and 2, 21 and 22 respectively are in the form of semicylindrical shell portions, as can be clearly seen from FIGS. 1 and 3 respectively. The compensating weight 1 and 21 which is guided on the inner or shorter radius indicated at R1 in FIG. 1 and R3 in FIG. 3 is of greater mass in comparison with the other compensating weight 2 and 22 respectively which is guided at the outer or longer radius R2 and R4 respectively. In both embodiments the masses of the compensating weights and the radii are matched to each other in such a way that M1×R1=M2×R2 and M21×R3=M22×R4, wherein M1 denotes the mass of the compensating weight 1, M2 is the mass of the compensating weight 2, M21 is the mass of the compensating weight 21 and M22 is the mass of the compensating weight 22. Each of the two compensating weights 1, 2 and 21, 22 respectively in each of the two illustrated embodiments can be rotated through 360° about the axis of rotation A. The guide means and drive means used for that purpose are shown in and will be described in greater detail hereinafter with reference to FIGS. 2 and 4 respectively.

Looking now at FIGS. 2 and 4 therefore, electric control motors 3 and 4 serve to provide the drive force when positioning the compensating weights. The motors 3 and 4 are mounted to a housing 25 which can be for example of a cylindrical configuration by means of stationary mounting sleeves indicated at 13 and 14 which are coaxial with respect to the axis of rotation A. The motors 3 and 4 which are also disposed in cylindrical casings are disposed therefore coaxially with respect to the axis of rotation A. Their two motor shafts 5 and 6 are also concentric relative to the axis of rotation A and are directed towards each other. References 7 and 8 in the embodiment of FIGS. 1 and 2 and references 19 and 20 in the embodiment shown in FIGS. 3 and 4 identify mounting sleeves which are rotatable about the stationarily disposed motors 3 and 4 and the stationary mounting sleeves 13 and 14. The mounting sleeves 7 and 8, 19 and 20 are non-rotatably and directly connected to the respective motor shafts 5 and 6 by way of entrainment members illustrated in the form of entrainment pins 9 and 10. The rotatable mounting sleeves 7, 8 and 19, 20 for the compensating weights 1, 2 and 21, 22 respectively have inward flanges 26 and 27 which are non-rotatably connected to the motor shafts 5 and 6 respectively by way of the entrainment pins 9 and 10. It will be appreciated that the motor shafts 5 and 6 may also be connected to the mounting sleeves 7, 8 and 19, 20 respectively in other ways, for example by a spline arrangement or the like.

Looking now more specifically at the embodiment shown in FIGS. 1 and 2, the compensating weight 1 which is the inner of the two compensating weights 1 and 2 is connected to the mounting sleeve 7 which is drivable by the motor 3. The other outer compensating weight 2 is connected to the rotatable mounting sleeve 8 which is driven by the motor 4. The connection between the two compensating weights 1 and 2 and the respective mounting sleeves 7 and 8 is made by way of outwardly disposed end flanges 28 and 29 respectively. The compensating weights 1 and 2 are connected to the flanges 28 and 29 by means of respective screws as indicated at 30 and 31. In that arrangement the flange 28 of the one rotatable mounting sleeve 7 is disposed at one end of the arrangement while the flange 29 of the other rotatable mounting sleeve 8 is disposed at the other end. The rotatable mounting sleeves 7 and 8 are mounted rotatably by means of rolling bearings diagrammatically indicated at 32, 33 and 34, 35 on the mounting sleeves 13 and 14 which are fixedly connected to the housing 25 or which are integral therewith.

At one end, being the upper end in FIG. 2, the housing 25 has a fixing flange 36 to which a grinding wheel (not shown) can be suitably connected by means of screw bolts 37 and 38.

The supply of power for the motors 3 and 4 is by way of a coaxially introduced electrical feed line indicated at 39.

It will be noted here that the arrangement of the individual components and the compensating weights is such that, upon displacement of the compensating weights for compensation of unbalance on the grinding wheel, the center of gravity of the overall arrangement moves on the central plane E of the grinding wheel, which is perpendicular to the axis of rotation A thereof. The arrangement of the masses of the individual components in the housing is such that, depending on the position of the unbalance to be compensated, the center of gravity of such masses assumes a given angular position, which is in opposite relationship to the angular position of the unbalance, in the plane E.

Referring now to the embodiment of FIGS. 3 and 4, the mounting sleeve 20 to which the outer and thus lighter compensating weight 22 is connected is mounted rotatably on the stationary mounting sleeve 13 by means of a rolling bearing 40. The bearing 40 is disposed at one end of the overall arrangement, being the upward end in FIG. 4. The mounting sleeve 20 has an outward flange 17 to which the compensating weight 22 is fixedly connected at one end, being the upward end in FIG. 4, by means of screws 41. At the other end the compensating weight 22 is connected to a further mounting sleeve 24 by screws 43. The mounting sleeve 24 which is of an annular configuration bears by way of a rolling bearing 42 against the outside of the mounting sleeve 19 to which the other compensating weight 21 is connected. In that way the compensating weight 22 is supported at both its ends in the housing at the two fixed mounting sleeves 13 and 14, with the support at the mounting sleeve 14 being by way of the rotatable mounting sleeve 19 for the compensating weight 21 of the greater mass.

In the same manner, the compensating weight 21 is connected at its one end, being the lower end in FIG. 4, by means of screws 44, to an outer mounting flange 45 of the mounting sleeve 19. The mounting sleeve 19 is rotatably mounted by means of a rolling bearing 46 at the lower end of the arrangement in FIG. 4 on the stationary mounting sleeve 14 to which the motor 4 is also fixed in the interior thereof. At its other end the compensating weight 21 is connected by screws 47 to an additional rotatable mounting sleeve 23. The additional rotatable mounting sleeve 23 is supported by way of a rolling bearing 48 on the outside of the rotatable mounting sleeve 20 for the other compensating weight 22. In that way the compensating weight 21, like the compensating weight 22, is also supported at the two cylindrical stationary mounting sleeves 13 and 14 which are arranged concentrically around the axis of rotation A of the grinding wheel, with the support action at the stationary mounting sleeve 13 being by way of the rotatable mounting sleeve 20 for the other compensating weight 22.

The two rolling bearings 40 and 46 which support the rotatable mounting sleeves 20 and 19 at the stationary cylindrical mounting sleeves 13 and 14 are inwardly disposed bearings while the two rolling bearings 48 and 42 which support the additional mounting sleeves 23 and 24 on the rotatable mounting sleeves 20 and 19 are outwardly disposed rolling bearings, relative to the rolling bearings 40 and 46. That design configuration thus provides for the two compensating weights 21 and 22 rotary supports at the respective ends thereof, which ensure that the respective one compensating weight is supported by way of the bearing sleeve of the other compensating weight on the stationary mounting sleeves 13 and 14.

In this embodiment also the housing 25 has a fixing flange 36 to which the grinding wheel (not shown) can be secured by means of screw bolts 37 and 38, while the supply of power for the drive motors 3 and 4 is by way of the electrical feed line 39. The arrangement of the components and compensating weights is once again such that, upon displacement of the compensating weights for unbalance compensation of the grinding wheel, the center of gravity of the overall arrangement moves on the central plane E of the grinding wheel. The arrangement of the masses of the individual components in the housing of the apparatus is such that, depending on the position of the unbalance of the grinding wheel, which has to be compensated, the center of gravity of the above-mentioned masses occupies a given angular position in the plane E, which is opposite the position of the unbalance requiring compensation.

Figure 5:
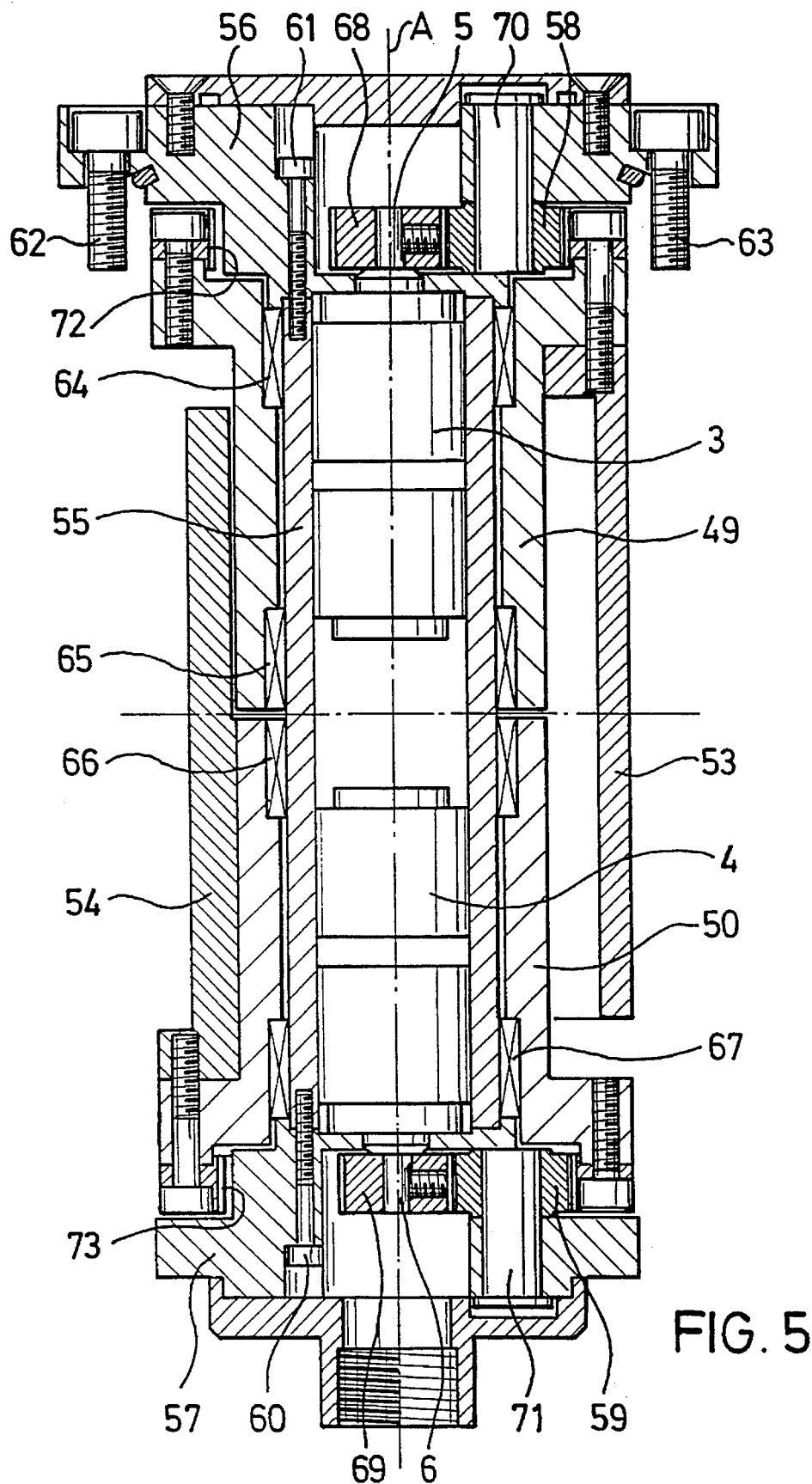
FIG. 5 is a view in longitudinal section through a third embodiment of the present invention.

Referring now to the embodiment of FIG. 5, the two control motors 3 and 4 are arranged in a common cylindrical holding means formed by a mounting sleeve or tube 55 which extends at least substantially through the entire apparatus. The cylindrical holding means 55 further serves to connect end mounting plates 56 and 57 together, the mounting plates 56 and 57 being suitably fixed to respective ends of the cylindrical holding means 55. The end mounting plates 56 and 57 are non-rotatably connected to the holding means 55 by means of screws as indicated at 60 and 61. The grinding wheel (not shown) can be non-rotatably connected by means of further screws as indicated at 62 and 63 to the composite structure consisting of the two end mounting plates 56, 57 and the cylindrical holding means 55 connecting same.

As in the two embodiments described above with reference to FIGS. 1 and 2 and FIGS. 3 and 4 respectively, the compensating weights 53 and 54 in this embodiment are also in the form of shell portions of an at least substantially semicylindrical configuration. The masses of the compensating weights and their respective radii from the axis of rotation A of the grinding wheel are such that the product of the mass of each compensating weight and its associated radius is the same as the product of the mass of each other compensating weight and its associated radius.

The compensating weight 53 which is the outer and thus lighter compensating weight is connected by screws to a rotatable mounting sleeve 49. The rotatable mounting sleeve 49 is rotatably mounted on the outside peripheral surface of the cylindrical holding means 55 by means of rolling bearings 64, 65.

The other compensating weight 54 is connected to a rotatable mounting sleeve 50 which is similarly rotatably mounted on the outside peripheral surface of the cylindrical holding means 55 by means of rolling bearings 66 and 67.

A suitable transmission such as a gear transmission serves to transmit the rotary drive movement of the shafts 5 and 6 of the motors 3 and 4 to the rotatable mounting sleeves 49 and 50. The gear transmission comprises gears 68 and 69 which are non-rotatably connected to the motor shafts 5 and 6, for example by a spline connection or other suitable entrainment arrangement. The gears 68 and 69 mesh with gears 58 and 59 which are mounted on the end mounting plates 56 and 57 by means of mounting pins 70 and 71. The gears 58 and 59 mesh with respective internal gear rings 72 and 73 on the mounting sleeves 49 and 50. The gear transmissions consisting of the respective gears indicated above and the internal gear rings are like simple planetary or epicyclic transmissions. As the illustration in FIG. 5 shows, a gear transmission is disposed at each end of the apparatus. The mounting plates 56 and 57 may also be of an annular configuration, as is shown in FIG. 5.

It will be seen from the foregoing description of preferred embodiments of the apparatus according to the present invention that the apparatus can provide for suitable unbalance compensation of a grinding wheel by appropriately positioning the compensating weights around the axis of rotation with symmetrical mass distribution thereof relative to the central plane of the grinding wheel, which is perpendicular to its axis of rotation, while the compensating weights are so arranged that they can be displaced into mutually overlapping positions as required.

It will be appreciated that the above-described constructions have been set forth solely by way of example and illustration of the principles of the present invention and that various modifications and alterations may be made therein without thereby departing from the spirit and scope of the present invention.

What is claimed is:

1. An apparatus for compensating for unbalance in a grinding wheel rotatable about an axis of rotation, comprising:

first and second compensating weights rotatably disposed with symmetrical mass distribution relative to a central plane of said grinding wheel which is perpendicular to said axis of rotation;

first and second electric motors having motor shafts to produce different angular positions of said first and second compensating weights, respectively, said motor shafts being concentrically arranged with said axis of rotation; and first and second rotating mounting sleeves rotatably mounted to guide said first and second compensating weights respectively through 360° about said axis of rotation, said first and second rotating mounting sleeves being drivingly connected to said motor shafts of said first and second electric motors respectively, said compensating weights being disposed at different radii from said axis of rotation so that the product of a mass of each of said first and second compensating weights and an associated radius of said radii is of at least substantially a same magnitude for each of said first and second compensating weights.

2. Apparatus as set forth in claim 1 including a housing and fixed mounting sleeves which are fixed with respect to the housing, said first and second electric motors each being carried by an associated fixed mounting sleeve of said fixed mounting sleeves.

3. Apparatus as set forth in claim 2 wherein said first rotating mounting sleeve guiding said first compensating weight is mounted on one said associated fixed mounting sleeve and said second rotating mounting sleeve guiding said second compensating weight is mounted on another said associated fixed mounting sleeve.

4. Apparatus as set forth in claim 1 wherein each of said rotating mounting sleeves has an outwardly disposed flange to which a one of said first and second compensating weights is mounted.

5. Apparatus as set forth in claim 4 and further including means for additionally rotatably mounting said first compensating weight to said second compensating weight and rotatably mounting said second compensating weight to said first compensating weight.

6. Apparatus as set forth in claim 5 wherein said additional rotatable mounting means includes a further outwardly disposed rotatable mounting sleeves for additionally rotatably mounting each of said first and second compensating weights.

7. Apparatus as set forth in claim 1 wherein said first and second rotating mounting sleeves are oriented and arranged so as to permit said first and second compensating weights respectively to be rotated into mutually overlapping positions.

8. Apparatus as set forth in claim 1 wherein said first and second electric motors, are mounted within a common cylindrical housing which has first and second ends and first and second end mounting plates connected to an associated end of said first and second ends of said cylindrical housing, one said end mounting plate being non-rotatably connectable to a grinding wheel.

9. Apparatus as set forth in claim 8 and further including at least one gear mounted on each of said end mounting plates, said gear transmitting rotary movement of the motor shafts to the rotating mounting sleeves.

10. The apparatus of claim 1 wherein said compensating weights are in the form of semi-cylindrical shell members.

11. An apparatus for compensating for unbalance in a grinding wheel rotatable about an axis of rotation, comprising:

compensating weights rotatably disposed with symmetrical mass distribution relative to a central plane of said grinding wheel which is perpendicular to said axis of rotation;

an electric motor associated with each of said compensating weights to produce different angular positions of each of said compensating weights, each said electric motor having a motor shaft concentrically arranged with said axis of rotation; and a rotating mounting sleeve associated with each of said compensating weights rotatably mounted to guide each of said compensating weights through 360° about said axis of rotation, said rotating mounting sleeve being drivingly connected to said motor shaft of said electric motor associated with each of said compensating weights, each of said compensating weights being disposed at different radii from said axis of rotation so that the product of a mass of each of said compensating weights and an associated radius of said radii is of at least substantially a same magnitude for each of said compensating weights.

12. The apparatus of claim 11 wherein said compensating weights are in the form of semi-cylindrical shell members.

* * * * *